Figure 1:
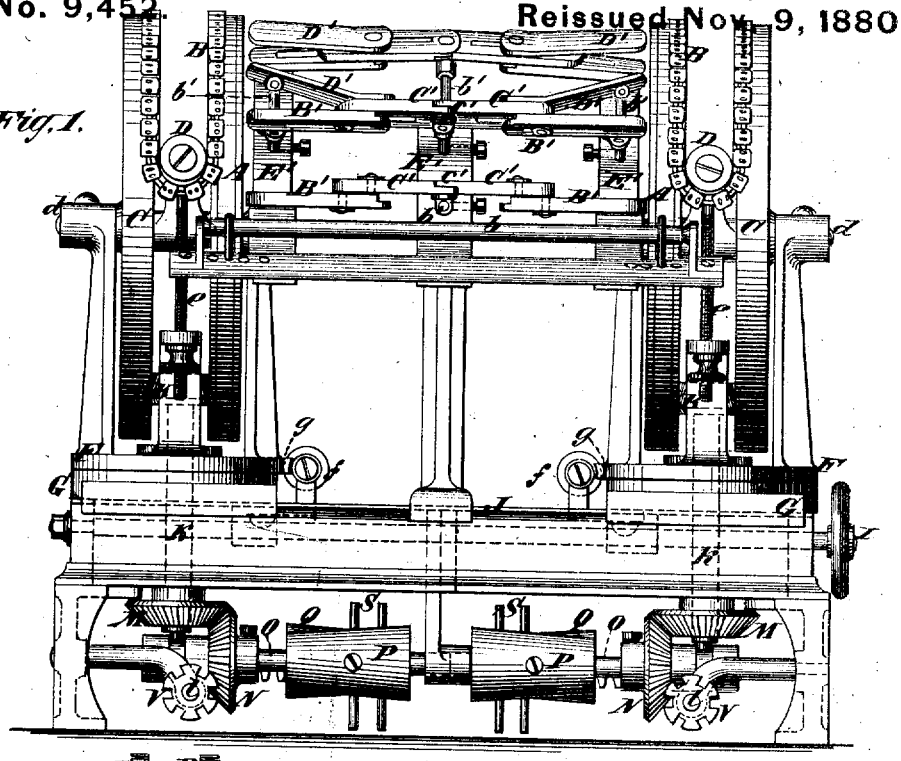

2 Sheets—Sheet 1.

I. E. PALMER,

Assignor, by mesne assignments, to himself and V. S. ALLIEN.

Machinery for Tentering and Straightening Fabrics.

No. 9,452. Reissued Nov. 9, 1880.

Witnesses
John Becker
Thos Haynes

Inventor
Isaac E. Palmer
by his Attorneys
Brown & Brown

2 Sheets—Sheet 2.

I. E. PALMER,

Assignor, by mesne assignments, to himself and V. S. ALLIEN.

Machinery for Tentering and Straightening Fabrics.

No. 9,452. Reissued Nov. 9, 1880.

Witnesses
John Becher
Fred Haynes

Inventor
Isaac E. Palmer
by his Attorneys
Brown & Brown

UNITED STATES PATENT OFFICE.

ISAAC E. PALMER, OF MIDDLETOWN, CONNECTICUT, ASSIGNOR, BY MESNE ASSIGNMENTS, TO HIMSELF AND VICTOR S. ALLIEN.

MACHINERY FOR TENTERING AND STRAIGHTENING FABRICS.

SPECIFICATION forming part of Reissued Letters Patent No. 9,452, dated November 9, 1880.

Original No. 161,896, dated April 13, 1875. Application for reissue filed January 8, 1880.

*To all whom it may concern:*

Be it known that I, ISAAC E. PALMER, of Middletown, in the county of Middlesex and State of Connecticut, have invented certain Improvements in Machines for Tentering and Straightening Fabrics, of which the following is a specification.

One part of this invention consists in a novel combination of selvage-carrying wheels, means of producing their rotary motion, endless chains or bands for confining the selvages of the cloth or other fabric thereto, and idler-wheels and guide rolls or pulleys for keeping the said bands in proper relation to the selvage-carrying wheels.

The invention also consists in the combination, with selvage-carrying devices on opposite sides of the machine, of mechanism to provide for the driving of said devices at different velocities in a positive manner, as hereinafter more fully described; also, in the particular combinations of mechanism hereinafter described for this purpose.

The invention likewise consists in novel combinations, hereinafter described, of selvage-carrying wheels, chains or bands running on said wheels, idler-wheels and guide-rolls for assisting to support said bands or chains, means of adjusting said guide-wheels, and a turn-table on which said wheels, bands, guide-rolls, and means of adjustment are supported or carried, all adjustable together upon a support provided for the turn-table for the purpose of varying the stretch of the fabric.

The invention further consists in the combination, with selvage-carrying wheels and chains or bands for confining the selvages of the fabric thereto, of a drying-cylinder, to which the fabric is delivered from said wheels and chains or bands, for the purpose of being dried in the condition to which it has been stretched or tentered.

The invention furthermore consists in the combination, with selvage-carrying devices, which consist of wheels and chains or bands, of a drag roller or bar on the delivery side of said devices, for the purpose of preserving the stretch given to the fabric by the said carrying devices. This roller is preferably interposed directly between the said devices and the first drying-cylinder.

The invention moreover consists in the combination, with selvage-carrying wheels, mechanism for driving the same positively, and bands for confining the selvages of the fabric thereto, of a friction frame or drag interposed between the said wheels; also, in the combination of a drying-cylinder with said wheels, positive driving mechanism, and interposed drag; and in the combination, with such wheels, driving mechanism, interposed friction frame or drag, and drying-cylinder, of a drag roll or bar between the said wheels and interposed friction frame or drag and the drying-cylinder.

The invention finally consists in the novel construction of a friction stretching frame or drag to be employed between the selvage-carrying devices, whereby said frame or drag is rendered not only capable of expansion and contraction breadthwise of the web, but also, if necessary, of being more or less bowed in or out radially relatively to the axes of the selvage-carrying devices, whereby more perfect provision is made for regulating the stretch of the fabric between the selvages.

Figure 2:
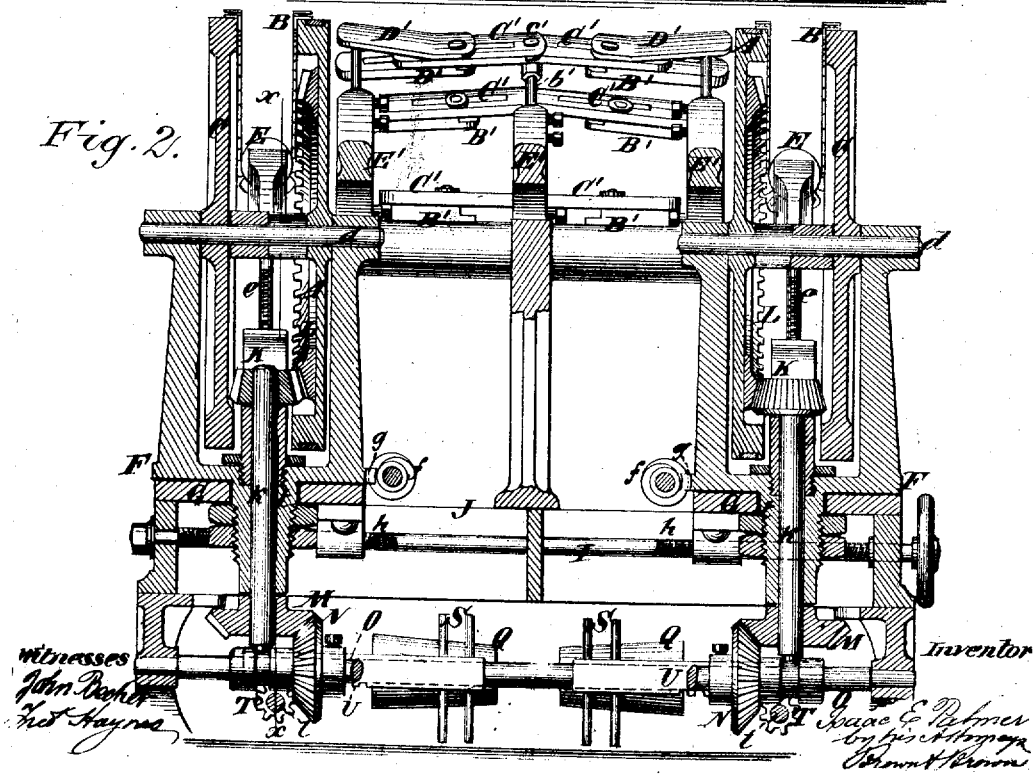
Figure 4:
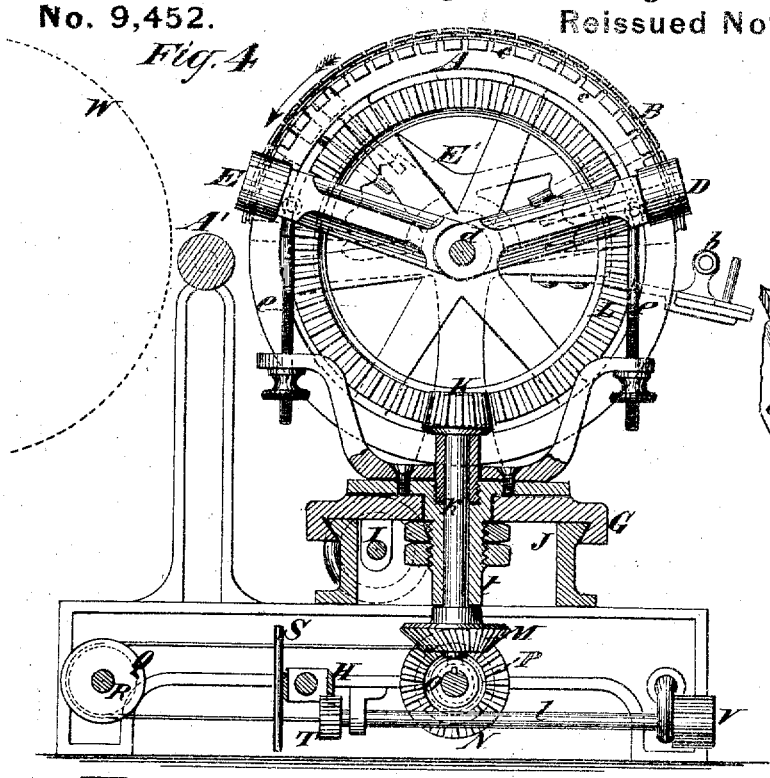
Figure 5:
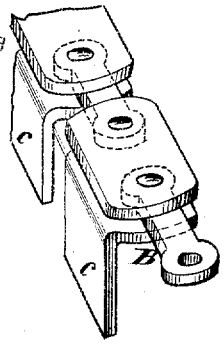
Figure 3:
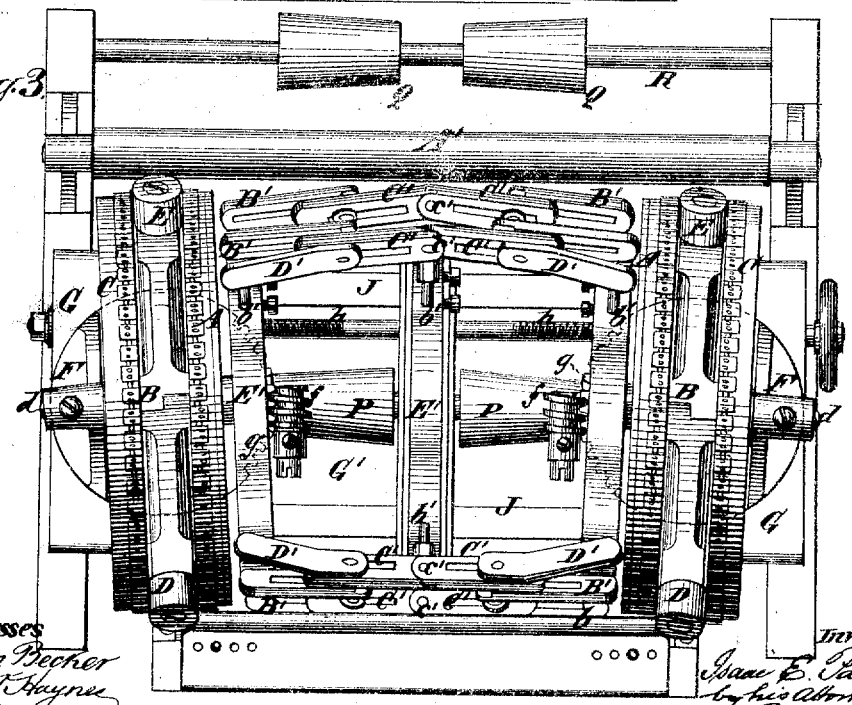

In the accompanying drawings, Figure 1 is a front elevation of a machine constructed in accordance with my invention. Fig. 2 is a central vertical section in a direction transverse to the feed; Fig. 3, a plan; Fig. 4, a vertical section on the line *x x* of Fig. 2. Fig. 5 is a view, in perspective, of a section of either selvage-holding chain.

What may as a whole be termed the "selvage-carrying devices" in this machine consist of selvage-carrying wheels A A, endless chains B B, running on said wheels, to hold thereto the selvages of the goods to be tentered and straightened, loose wheels or idlers C C, which assist the said wheels A A to support the said chains, guide-wheels D E to keep the said chains extended, and the supports hereinafter described for said wheels. One set of such devices is employed on each side of the machine to carry the selvage of the fabric to be tentered. The wheel A on either side of the machine is arranged obliquely or diverging from the corresponding wheel A on the opposite side of the machine. The said wheels A A are represented as having cylindrical peripheries, upon which the chains run, the selvages of the fabric being introduced to the machine under a roller or bar, *b*, in front, so that its selvages may pass upwardly to where they enter between the said wheels A A and the portions of the chains B B running thereon, entering at where the space between the two wheels is narrowest, while the body of the fabric passes up over the intermediate stretching frame or drag, which will be hereinafter described.

The selvage-holding chains B B may be variously constructed; but they are here shown (see Fig. 5) as composed of upper and lower plates connected with each other by narrower intermediate links, so that the plates overlap the latter, and the lower range of said plates have lips or flanges *c*, which serve to guide them in their travel over the carrying-wheels A A in a forward direction, and in their return over the loose wheels or idlers C C, the flanges *c* resting against the inner sides of the wheels C C and outer sides of wheels A A. By this construction of the chains the tendency of the tension of the fabric to draw the chains toward each other is prevented, as the flanges *c* have a bearing against the outer sides of the rolls A A and preserve the tension of the fabric.

The idlers C C occupy an outside parallel relation with the carrying-wheels A A, upon the shafts *d d* of which they turn loosely, and they are of corresponding diameter, or thereabout, with the carrying-wheels, the chains B B passing, as described, in reverse directions over the wheels A and C and around intermediate front and back guide-rolls, D E, which are represented as fitted to turn on pivots on the ends of arms which are arranged to turn on the shafts *d d*, and which may be adjustable by means of screws *e* to keep the chains at the necessary tautness. The inner length or line of these chains travels in common with the carrying-wheels A—that is, toward the back of the machine or in the diverging direction of said wheels, as indicated by arrow in Fig. 4; and the carrying-wheels A, their shafts *d*, the idlers C, and the guide-rolls D E at both sides or ends of the machine are carried by turn-tables F, which may be turned to vary the obliquity, as required, of the selvage-carrying wheels and holding-chains, such variation having the effect of varying the lateral stretching action of the said wheels and chains, which action is greater or less according as the said wheels and chains diverge more or less from each other. This is done independently, as regards the two sets of selvage-carrying devices on opposite sides of the machine, by means of screws *f* and worm wheels or sectors *g*, connected with the turn-tables F. These turn-tables F are pivoted by pivotal studs *t t* to slides G, adjustable crosswise of the machine by means of right and left hand screw-threads *h* on a shaft, I, along a lower cross bed or beds, J, to vary the distance apart of the selvage-carrying devices. The axes of the studs *t t*, if prolonged, would intersect the axes of the shafts *d d* of their respective selvage-carrying wheels.

The selvage-carrying wheels A A, which may be of any suitable elastic or roughened construction on their peripheries, are driven by bevel-pinions K K, arranged to gear with bevel wheels or teeth L L on the outer faces of the carrying-wheels, the shafts *k* of said pinions passing down through the lower pivotal studs or sleeves of the turn-tables F, and carrying on their lower ends bevel-gears M M, which gear with bevel-gears N N on independent lower horizontal shafts, O, fitted with independent conical pulleys P P, to either or both of which motion is communicated by bands or belts from conical pulleys Q Q, fast on a horizontal driving-shaft, R.

The pulleys Q Q and P P, shafts O O, bevel-gears N N M M, shafts *k k*, bevel-pinions K K, and bevel-gears L L constitute a variable transmitting mechanism for transmitting motion from the driving-shaft R to the carrying devices, which, while the shaft R rotates at a constant speed, admits of either set of selvage carrying and holding devices being run or driven in a positive manner at a different velocity from those on the other side of the machine; or the movement of one set of such devices may be temporarily retarded to provide for various contingencies as regards the run of the fabric at the one selvage relatively to the other or to the body of the fabric. The said variable transmitting mechanism also permits the speed of the selvage-carrying devices to be varied relatively to the speed of driving-shaft R, whether or not the speed of the two sets of devices relatively to each other is at the same time varied. The variation is controlled by shifting the belts or bands which connect the conical pulleys Q Q with the independently-operating conical pulleys P P by means of sliding belt-shifters S S. These belt-shifters may be actuated in various ways, but preferably by the feet of the operators, as—for instance, by means of pinions T, arranged to gear with sliding racks U, carrying the belt-shifters, the shafts *l l* of said pinions being provided with foot-rolls V, for the purpose of enabling the operators to actuate the pinions to the right or to the left, as required, by simply slightly working the foot on or over the rolls.

Instead of the foot-rolls being on the shafts *l l*, the said shafts may be geared by bevel-gears with two short horizontal shafts arranged parallel with the shaft O, and the foot-rolls may be fast on the said two short shafts near together, to be conveniently worked by one operator sitting in front of the machine.

The variable transmitting mechanism hereinabove described for separately or independently regulating the motions of the two sets of selvage-carrying devices on opposite sides of the machine constitutes a very simple and effective means for attaining the desired end. Furthermore, by the concentric arrangement of the shafts *k* with the turn-tables F, the turning of the tables in no wise interferes with the driving of the wheels A A under all adjustments of the latter. To provide for the setting in or out relatively to each other of the selvage-carrying wheels A A by the movement of the slides G along the bed or beds J, the pinions N should be fitted to slide by feather on the independent shafts O which carry them, or other provision should be made for the adjustment of the said gears.

Arranged across the machine at the foot of the chains B B, or immediately below the guide-rolls E E, around which the back ends of the chains pass, is a roller, A′, beneath which the fabric passes in an upward direction to the first of the usual or any suitable series of drying rolls or cylinders. As the use of drying-cylinders in this class of machines is well understood by those skilled in the art, I have not considered it necessary to represent such cylinders in full, believing that my invention will be sufficiently illustrated by indicating the position of the first cylinder of the series in Fig. 4 of the drawings at W W by a dotted outline, which represents a portion of the periphery of said cylinder. The interposition of this roller A′ between the delivery ends of the chains and said drying-cylinder serves to prevent the stretched fabric from losing its stretch in passing from the tentering devices to the drying-cylinder by reducing the exposure of the fabric to an unsupported run during such passage. I prefer to apply to this roller some means of producing friction to act as a brake, that the roller may produce a drag on the fabric. Instead of the roller a bar might be used; but the roller with friction is preferable. When it is not desired to maintain at a fixed tension the stretch of the fabric between said roller or bar and the drying-cylinder, then the selvage-carrying devices and roller A′ or bar on the delivery side of the latter may be moved in common farther away from the first drying-cylinder.

By the combination, with the drying-cylinders, of the selvage-carrying devices composed of obliquely-arranged selvage-carrying wheels and chains or bands running over portions of the peripheries of said wheels, the continuous tentering of the fabric and its delivery in a tentered condition to the drying-cylinders are effected without its being punctured or having its meshes distorted or its threads displaced at or near the selvages.

The friction frame or drag, herein shown interposed between the selvage-carrying devices for the purpose of stretching the fabric between its selvages and preventing its body from running ahead of the selvages, is of stationary construction, and composed of any number of divided stringers extending across the machine, so that they are capable of being expanded or contracted in a transverse relation with the feed or run of the fabric over them to adapt the drag to different widths of fabric. This friction surface or frame or drag, moreover, has its stringers also capable of being separately set in or out radially in relation with the traveling selvage-carrying devices, and either set straight or bowed in or out, for the purpose of adjusting the stretch on the body of the fabric. To this end the stringers composing the drag are made up of longitudinally-slotted bars B′ B′ and C′ C′, with or without wings D′ D′, the whole being carried in an adjustable manner, as regards setting them in or out relatively to the axes of the wheels A A, by means of attached sliding rods or guides *b′ b′* entering fixed standards E′, and retained in position therewith by set-screws or otherwise, and the center bars C′ C′ of each stringer being jointed or pivoted to each other, as at *c*. It is preferred to leave a wide vacant space, as at G′, between these stringers composing the drag, in the upper portion of the latter, for the purpose of allowing the fabric, by slightly sagging, to adjust or recover itself if unduly or irregularly stretched in its passage over the drag.

I claim—

1. The combination, with the oblique or divergingly-arranged selvage-carrying wheels A A and means for producing their rotary motion, of the loose side wheels or idlers C C, the chains or bands B B, and the front and back guides or rolls, D E, substantially as specified.

2. The combination, with separately-hung and independently-operating selvage-carrying devices on opposite sides of a machine for tentering and straightening fabrics, of mechanism for positively-driving said carrying devices at different velocities relatively with each other, essentially as and for the purposes herein set forth.

3. The combination, with selvage-carrying devices on opposite sides of a machine for tentering and straightening fabrics and a driving-shaft for driving the said carrying devices, of continuously and positively operating variable transmitting mechanism between said driving-shaft and said carrying devices, for transmitting motion from said shaft to said carrying devices on both sides at a time, at different velocities relatively to that of the said driving-shaft, substantially as herein described.

4. The combination, with selvage-carrying devices on opposite sides of a machine for tentering and straightening fabrics and a driving-shaft for driving the said carrying devices, of variable-motion-transmitting mechanism between said driving-shaft and said carrying devices and means for controlling said variable-motion-transmitting mechanism during the operation of the machine, whereby the velocity of the motion transmitted from said shaft to said carrying devices may be varied relatively to that of the driving-shaft without stopping the machine, substantially as herein described.

5. The combination, with separately-hung and independently-operating selvage-carrying devices on opposite sides of a machine for tentering and straightening fabrics and a driving-shaft common to the said devices, of variable transmitting mechanism interposed between said driving-shaft and the said carrying devices, for transmitting motion from said shaft to the said carrying devices at different velocities both relatively to each other and relatively to the driving shaft, substantially as herein described.

6. The combination, with the independently-operating selvage-carrying wheels A A, of the driving-shaft R and its conical driving-pulleys Q Q, the independent shafts O O and their secondary conical pulleys P P, the belt-shifters S S and means for operating them, and gearing connecting said independent shafts O O with the said wheels A A, substantially as herein described.

7. The combination of the foot-rolls V V and their shafts *l l*, the belt-shifters S S, connecting devices between said shafts and belt-shifters, the driving-shaft R and its conical driving-pulleys Q Q, and the secondary independently-operating conical pulleys P P and their shafts O O, substantially as specified.

8. The combination, on either side of a machine for tentering and straightening fabrics, of a selvage-carrying wheel, a chain or band for confining the fabric to said wheel, a loose wheel or idler, and guide-rolls for assisting said selvage-carrying wheel to support and carry said chain or band, a single turn-table supporting said carrying-wheel, idler, guide-rolls, and chain or band, and a support on which the said turn-table is capable of turning to adjust the said wheel, idler, rolls, and chain, all together by one adjustment, substantially as herein described.

9. The combination, on either side of a machine for tentering and straightening fabrics, of a selvage-carrying wheel, a chain or band for confining the fabric to said wheel, a loose wheel or idler, and adjustable guide-rolls for assisting said selvage-carrying wheel to support and carry said chain or band, means for adjusting the said guide-rolls, a single turn-table supporting said carrying-wheel, idler, adjustable guide-pulleys, and means of adjustment, and a support on which said turn-table is capable of turning, substantially as herein described.

10. The combination, with selvage-carrying wheels, turn-tables on which said wheels are supported, adjustable slides on or in which said turn-tables are pivoted, and beds for supporting said slides, of shafts concentric with the pivotal centers of the said turn-tables, bevel-gears on said shaft, corresponding bevel gears or teeth on the selvage-carrying wheels, and means of transmitting rotary motion to said shafts, all substantially as herein described.

11. The combination, with selvage-carrying wheels and mechanism for driving the same and chains or bands extending over a portion of the periphery thereof for confining the selvages thereto, of a drag roller or bar arranged near the delivery-points of said wheels and bands or chains to produce a dragging friction on the fabric, substantially as and for the purpose herein described.

12. The combination, with independently-hung and independently-operating selvage-carrying wheels on opposite sides of a machine for tentering and straightening fabrics, mechanism for driving said wheels, and chains or bands extending over portions of the peripheries thereof, of a drag roller or bar arranged near the delivery-points of said wheels, substantially as and for the purpose herein described.

13. The combination, with the selvage-holding chains or bands B B and the selvage-carrying wheels A A and mechanism for driving said wheels, of the transverse drag-roller A′, arranged at the foot of said chains, in rear of them, essentially as and for the purpose herein set forth.

14. The combination, in a machine for tentering and straightening fabrics, of selvage-carrying wheels presenting continuous peripherical surfaces for the support of the selvages of the fabric, mechanism for driving said wheels, chains or bands for confining the selvages continuously on the portions of said wheels which support them, and a drying-cylinder to which the fabric is delivered from said wheels and chains or bands, substantially as and for the purpose herein described.

15. The combination, in a machine for tentering and straightening fabrics, of independently-operating selvage-carrying wheels on opposite sides of the machine, mechanism for driving said wheels, chains or bands for confining the selvages on portions of the peripheries of said wheels, and a drying-cylinder to which the fabric is delivered from said wheels and chains, substantially as herein described.

16. The combination, in a machine for tentering and straightening fabrics, of selvage-carrying wheels, mechanism for driving said wheels, chains or bands for confining the selvages on portions of the peripheries of said wheels, a drying-cylinder for receiving the fabric from said wheels and chains or bands, and a drag roller or bar interposed between said wheels and chains or bands and the said drying-cylinder to produce a dragging friction on the fabric, substantially as herein described.

17. The combination, in a machine for tentering and straightening fabrics, of independently-operating selvage-carrying wheels on opposite sides of the machine, mechanism for driving said wheels, chains or bands for confining the selvages on portions of the peripheries of said wheels, a drying-cylinder for receiving the fabric from said wheels and chains or bands, and a drag roller or bar interposed between said chains or bands and the said drying-cylinder, substantially as herein described.

18. The combination, in a machine for tentering and straightening fabrics, of selvage-carrying devices on opposite sides of the machine, a driving-shaft for driving the said carrying devices, variable-motion-transmitting mechanism between said driving-shaft and said carrying devices for transmitting motion to the said devices at different velocities relatively to that of the said shaft, and a drying-cylinder to which the tentered and straightened fabric may be delivered from said carrying devices, substantially as herein described.

19. The combination, in a machine for tentering and straightening fabrics, of selvage-carrying wheels, mechanism for driving the same positively, bands for confining the said fabric to said wheels, and a friction frame or drag interposed between the said wheels, substantially as herein described.

20. The combination, in a machine for tentering and straightening fabrics, of selvage-carrying wheels, mechanism for driving the same positively, bands for confining the fabric to said wheels, a friction frame or drag interposed between said wheels, and a drying-cylinder to which the fabric is delivered from said wheels, substantially as described.

21. The combination, in a machine for tentering and straightening fabrics, of selvage-carrying wheels, mechanism for positively driving the same, bands for confining the fabric to said wheels, a friction frame or drag interposed between said wheels, a drying-cylinder, and a drag roll or bar between the said wheels and friction frame or drag and the drying-cylinder, all substantially as herein described.

22. The combination, with the selvage-carrying devices in a machine for tentering and straightening fabrics, of a friction frame or drag constructed of stringers composed of sliding and jointed sections, substantially as herein described, whereby said frame may not only be expanded or contracted longitudinally, but may also be set in or out and lowered in a radial direction relatively with the selvage-carrying devices, essentially as herein set forth.

ISAAC E. PALMER.

Witnesses:
J. A. PELTON,
E. B. BUDSEY.